United States Patent [19]
Yamaguchi

[11] Patent Number: 5,448,573
[45] Date of Patent: Sep. 5, 1995

[54] AUTOMATIC CIRCUIT SWITCHING DEVICE RESTORABLE WITHOUT A HIT AND ITS METHOD

[75] Inventor: Yasuhiro Yamaguchi, Tokyo, Japan
[73] Assignee: NEC Corporation, Tokyo, Japan
[21] Appl. No.: 158,362
[22] Filed: Nov. 29, 1993

Related U.S. Application Data

[63] Continuation of Ser. No. 905,384, Jun. 29, 1992, abandoned.

[30] Foreign Application Priority Data

Jun. 28, 1991 [JP] Japan ................... 3-185271

[51] Int. Cl.$^6$ ............................. G06F 11/00; H04J 3/02
[52] U.S. Cl. ................. 395/182.02; 371/20.1; 370/16; 395/200.01; 379/2
[58] Field of Search ............... 371/8.2, 11.2, 68.2; 455/8; 370/16

[56] References Cited

U.S. PATENT DOCUMENTS

| | | | |
|---|---|---|---|
| 4,477,895 | 10/1984 | Casper et al. | 371/8.2 |
| 4,529,842 | 7/1985 | Levy et al. | 371/8.2 |
| 4,686,675 | 8/1987 | Morimoto et al. | 371/8.2 |
| 5,187,706 | 2/1993 | Frankel et al. | 371/11.2 |
| 5,210,740 | 5/1993 | Anzai et al. | 371/11.2 |

FOREIGN PATENT DOCUMENTS

| | | | |
|---|---|---|---|
| 63-283236 | 11/1988 | Japan | 371/8.2 |
| 2-54640 | 2/1990 | Japan | 371/8.2 |
| 2-260839 | 10/1990 | Japan | 371/8.2 |
| 3-44243 | 2/1991 | Japan | 371/8.2 |

Primary Examiner—Hoa T. Nguyen
Attorney, Agent, or Firm—Sughrue, Mion, Zinn, Macpeak & Seas

[57] ABSTRACT

This unit is an automatic circuit switching device which performs synchronization of a regular circuit and a stand-by circuit to achieve switch back operation from the stand-by circuit to the regular circuits without any hit or short break of data transmission when the regular circuit is restored. Detectors $14_1$, $14_2$ output an instruction signal to establish a stand-by circuit when regular circuit 2 becomes disconnected and output an instruction signal to start comparison of synchronization when regular circuit 2 is restored from the disconnection, based on the results of monitoring of the signals. Terminal adapter circuits $15_1$, $15_2$ establish stand-by circuit 4 based on the instruction signal to establish the stand-by circuit and output switching instruction. Comparators $18_1$, $18_2$ control delay circuits $16_1$, $16_2$, $17_1$, $17_2$ based on the comparison start instruction and output switch back instruction when the above synchronization is achieved. Switching circuits $19_1$, $19_2$ transmit the output signals from delay circuits $17_1$, $17_2$ to the corresponding subscriber terminals based on the switching over instruction and transmit the output signals from delay circuits $16_1$, $16_2$ to the corresponding subscriber terminals based on the switch back instruction.

2 Claims, 6 Drawing Sheets

FIG. 2

AUTOMATIC CIRCUIT SWITCHING DEVICE RESTORABLE WITHOUT A HIT AND ITS METHOD

This is a Continuation of application Ser. No. 07/905,384 filed Jun. 29, 1992, now abandoned.

BACKGROUND OF THE INVENTION

1. Field of the invention

The present invention relates to an automatic circuit switching device for data communication, particularly to an automatic circuit switching device which switches over from a private circuit serving as a regular circuit to a public data exchange circuit, such as an Integrated Services Digital Network (ISDN) network circuit, arranged to be connected as a stand-by circuit, in the case of deterioration of the quality and disconnection of the regular circuit.

2. Description of Related Art

Figure 1:
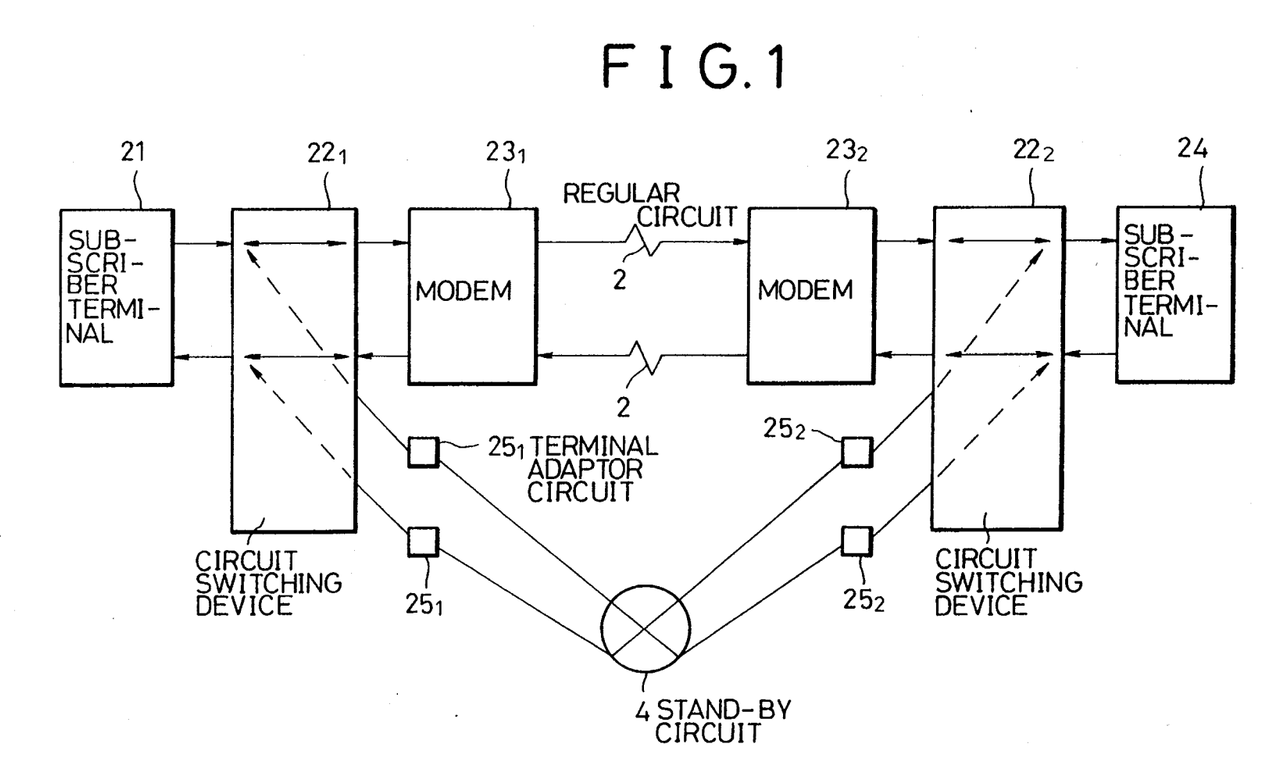
FIG. 1 is a block diagram showing an example of an automatic circuit switching device of the conventional type.

FIG. 1 is a block diagram showing an automatic circuit switching device of the conventional type.

The automatic circuit switching device of the conventional type usually accommodates private circuit 2 used as regular circuit through modem $23_1$, $23_2$ and an ISDN network circuit prepared for use as stand-by circuit 4 to back up the operation through corresponding terminal adaptor circuits $25_1$, $25_2$ at the legs of switching units $22_1$, $22_2$ which are connected to the each subscriber terminal $21_1$, $24_2$.

In FIG. 1, when the regular circuit between modems $23_1$ and $23_2$ is disconnected due to some trouble, data transmission between subscriber terminals 21 on the side of the host machine and subscriber terminal device 24 is stopped, thereby abnormality is usually detected at subscriber terminal 21 through monitoring of communications protocol. After abnormality is detected, a maintainer of the system operates circuit switching units $22_1$ and $22_2$ manually to connect a data communication bus to stand-by circuit 4 to back up the system.

In order to switch the circuit automatically, output signals of carrier detecting circuits provided respectively in modems $23_1$ and $23_2$ are used. Since the output signal of this carrier detecting circuit turns to "ON" when carrier is detected on regular circuit 2 and turns to "OFF" when the carrier is disconnected, modems $23_1$, $23_2$ detect the disconnection of the carrier only when the regular circuit is disconnected due to some trouble by keeping carrier constantly in the sending state.

Therefore, the automatic circuit switching is conducted by operating circuit switching units $22_1$, $22_2$ when the disconnection of carrier is detected using the output signal of the carrier detecting circuit as the control signal.

When regular circuit 2 is restored, the carrier is also sent again and the output of the carrier detecting circuit turns "ON", thereby it is possible to switch back both circuit switching units $22_1$ and $22_2$ automatically through the output signal of the carrier detecting circuit as the control signal.

When there are identification bits which can show presence of transmitted data in a data transmission units in use, the automatic switching of the circuit can be performed in the same way by using the data transmission units instead of modems $23_1$ and $23_2$.

However, the automatic circuit switching device of the conventional type fails in the normal connection of data (bit irregularity). In the worst case, restarting of the host and subscribers terminal is required when it is switched back from the stand-by circuit to the regular circuit either manually or automatically, because the regular circuit and stand-by circuit are not typically synchronized with each other.

SUMMARY OF THE INVENTION

An object of the present invention is to provide an automatic circuit switching device which can solve the above problem, and consequently can synchronize data transmission between the regular circuit and the stand-by circuit, and further can switch back the above circuits without any hit, i.e. short break of the data transmission.

Another object of the present invention is to provide an automatic circuit switching device which can perform switch back operation without any hit and any restriction of the characteristics of the transmission system and terminal device.

In order to achieve the objects described above, the automatic circuit switching device according to the present invention comprises monitoring means to monitor a signal indicating the normality of a regular circuit, means for switching over the connection of a subscriber terminal from a regular circuit to a stand-by circuit through a terminal adaptor circuit when detecting disconnection of the regular circuit, means for synchronizing the regular circuit with the stand-by circuit in use, means for switching back the connection of the subscriber terminal from the stand-by circuit to the regular circuit when synchronization is achieved. The automatic circuit switching device described above providing an ISDN network as its stand-by circuit is included in the present invention.

Further, the automatic circuit switching device described above having monitoring means which monitors a signal indicating the reception of the carrier for detecting the normality of the regular circuit is also included in the present invention.

Still further, the automatic circuit switching device according to the present invention may have monitoring means comprising a detector which outputs an instruction signal to establish connection of the stand-by circuit when the regular circuit is disconnected and outputs an instruction signal to start comparison when the regular circuit is restored from the disconnection thereof, according to the result of monitoring of the signal indicating the normality of the regular circuit, the terminal adaptor circuit establishes the stand-by circuit through the stand-by circuit terminating equipment and outputs an instruction signal to switch over the connection after establishing the stand-by circuit, the means for synchronizing both circuits comprises first and second variable delay circuits which delay the signals received from the regular circuit through the regular circuit terminating equiment and from the stand-by circuit throught the terminal adaptor circuit according to the designated delay time, and a comparator which inputs the delay time to the two delay circuits based on the comparison start instruction and outputs a switch back instruction signal when the output signal of two delay circuits coincide for a predetermined period of time, the means for switching over and switch back are comprised in a switching circuit which switches over the connection to the stand-by circuit based on the switchover instruction outputted from the terminal adaptor circuit and switches back the connection to the regular circuit based on the switch back instruction outputted from the comparator.

Another aspect of the present invention includes a method of automatic circuit switching comprising the steps of monitoring a signal indicating the normality of a regular circuit, switching over the connection of subscriber terminal from a regular circuit to a stand-by circuit when detecting disconnection of the regular circuit, synchronizing the regular circuit with the stand-by circuit in use when the connection of the subscriber terminal from the stand-by circuit to the regular circuit after the synchronization is achieved. The method of automatic circuit switching described above may monitor the signal outputted corresponding to the reception of the carrier of the signal indicating the normality of the regular circuit.

The method of automatic circuit switching described above may synchronize the restored regular circuit with the stand-by circuit by controlling each variable delay circuit joined to the regular circuit and the stand-by circuit.

The above and further objects and novel features of the invention will more fully appear from the following detailed description when the same is read in connection with the accompanying drawings. It is to be expressly understood, however, that the drawings are for purpose of illustration only and are not intended to define the limits of the invention.

DESCRIPTION OF THE PREFERRED EMBODIMENT

An embodiment of the present invention will be described with reference to the attached drawings.

Figure 2:
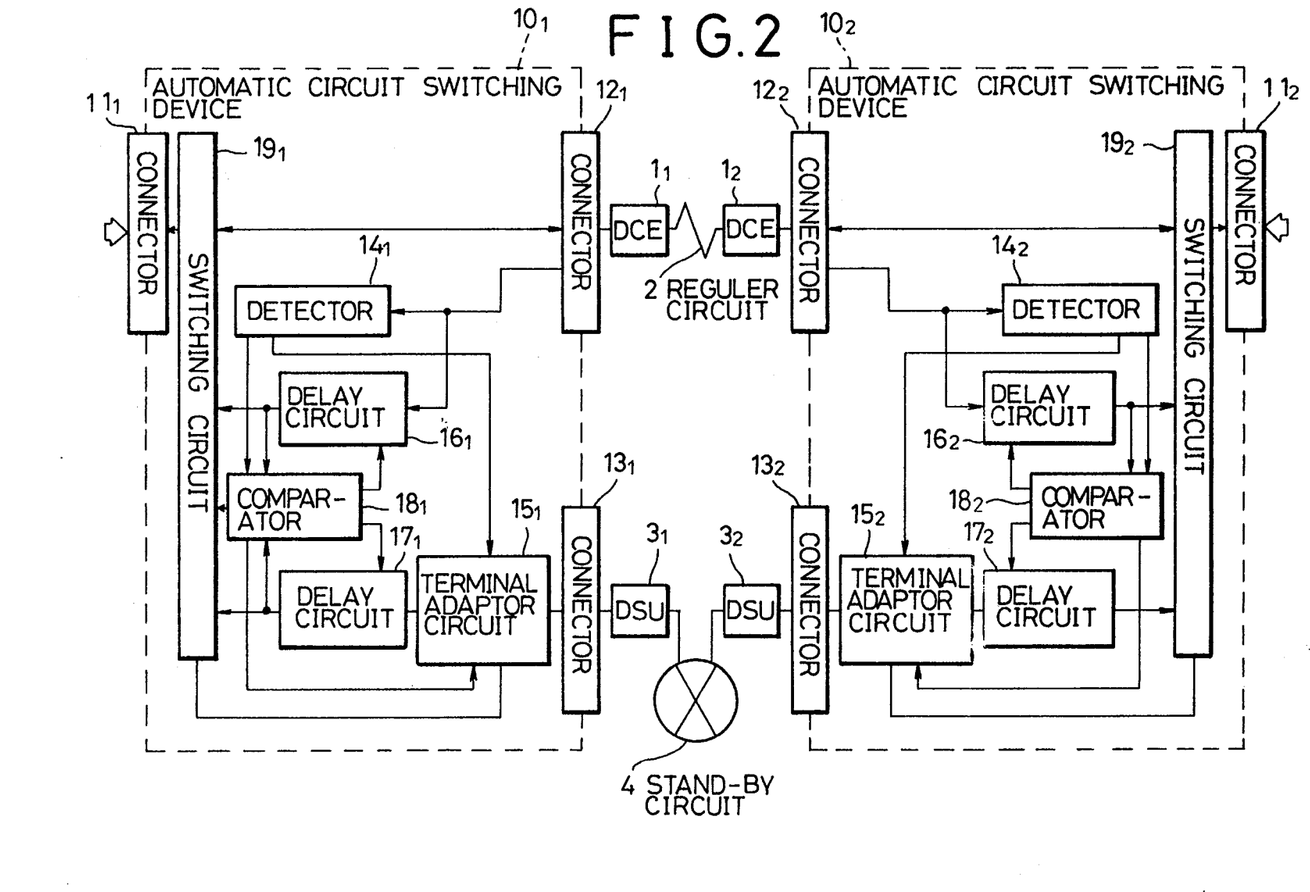
FIG. 2 is a block diagram of an embodiment of the automatic circuit switching device of the present invention.

FIG. 2 is a block diagram of an embodiment of the automatic circuit switching device of the present invention.

Automatic circuit switching devices $10_1$, $10_2$ are connected with subscriber terminals through connectors $11_1$, $11_2$, and switch the connections with regular circuit 2 through connectors $12_1$, $12_2$ and data-circuit-terminating equipment (DCE) $1_1$, $1_2$, to stand-by circuit 4 established by ISDN through modular jacks $13_1$, $13_2$ and data service units (DSU) $3_1$, $3_2$ respectively. Further, automatic circuit switching devices $10_1$ and $10_2$ each have detectors $14_1$, $14_2$, terminal adaptors $15_1$, $15_2$, first and second delay circuits $16_1$, $16_2$, $17_1$, $17_2$, comparators $18_1$, $18_2$, and switching circuits $19_1$, $19_2$. Detectors $14_1$, $14_2$ each output an instruction signal to establish a stand-by circuit when detecting the disconnection of regular circuit 2 by monitoring stoppage of the signal which is outputted from data-circuit-terminating equipment $1_1$, $1_2$. Detectors $14_1$, $14_2$ then output an instruction signal to start comparison of synchronization when regular circuit 2 is restored from the disconnection state. Terminal adaptor circuits $15_1$, $15_2$ each establish stand-by circuit 4 through data service units $3_1$, $3_2$ based on the instruction to establish a stand-by circuit and output a switching instruction signal. First and second delay circuits $16_1$, $16_2$, $17_1$, $17_2$ each receive communication signals inputted through data-circuit-terminating equipment $1_1$, $1_2$ (DCE) and terminal adaptor circuits $15_1$, $15_2$, and delay the above signals for the period designated by comparators $18_1$, $18_2$. Comparators $18_1$, $18_2$ each set the delay times by adjusting the variable delay circuits $16_1$, $16_2$ according to the instruction to start the comparison sent from detectors $14_1$, $14_2$ so that the delay times of the regular circuit and stand-by circuit through delay circuits $16_1$, $16_2$, $17_1$, $17_2$ may become equal. Comparators $18_1$, $18_2$ then output the instruction signal to switch back to the regular circuit when they coincide each other for more than a predetermined period. Switching circuits $19_1$, $19_2$ each switch over the connections of subscriber terminals from regular circuit 2 to delay circuits $17_1$, $17_2$ in accordance with the switch over instruction signal outputted from terminal adaptor circuits $15_1$ $15_2$ and switch back the connections of the subscribers terminals from delay circuits $17_1$, $17_2$ to delay circuits $16_1$, $16_2$ based on the switch back instruction signal outputted from comparators $18_1$, $18_2$.

Figure 3:
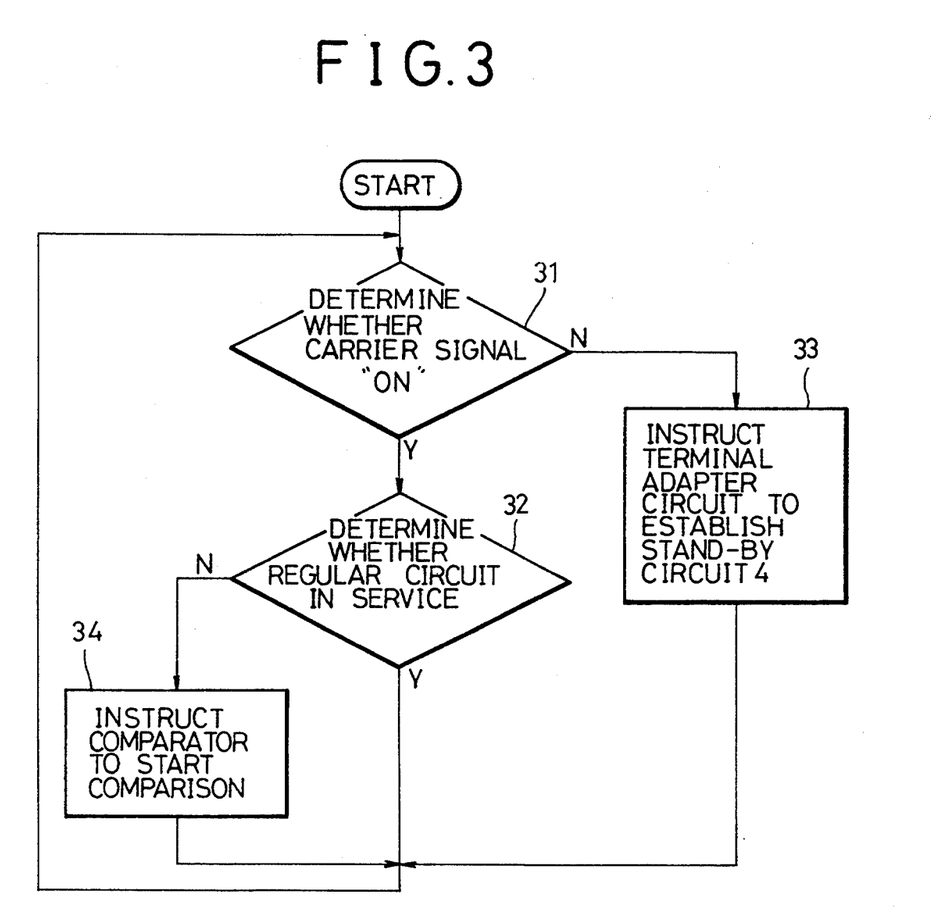
FIG. 3 is a flow chart showing operation of detectors $14_1$ and $14_2$ of the automatic circuit switching device shown in FIG. 2.
Figure 4:
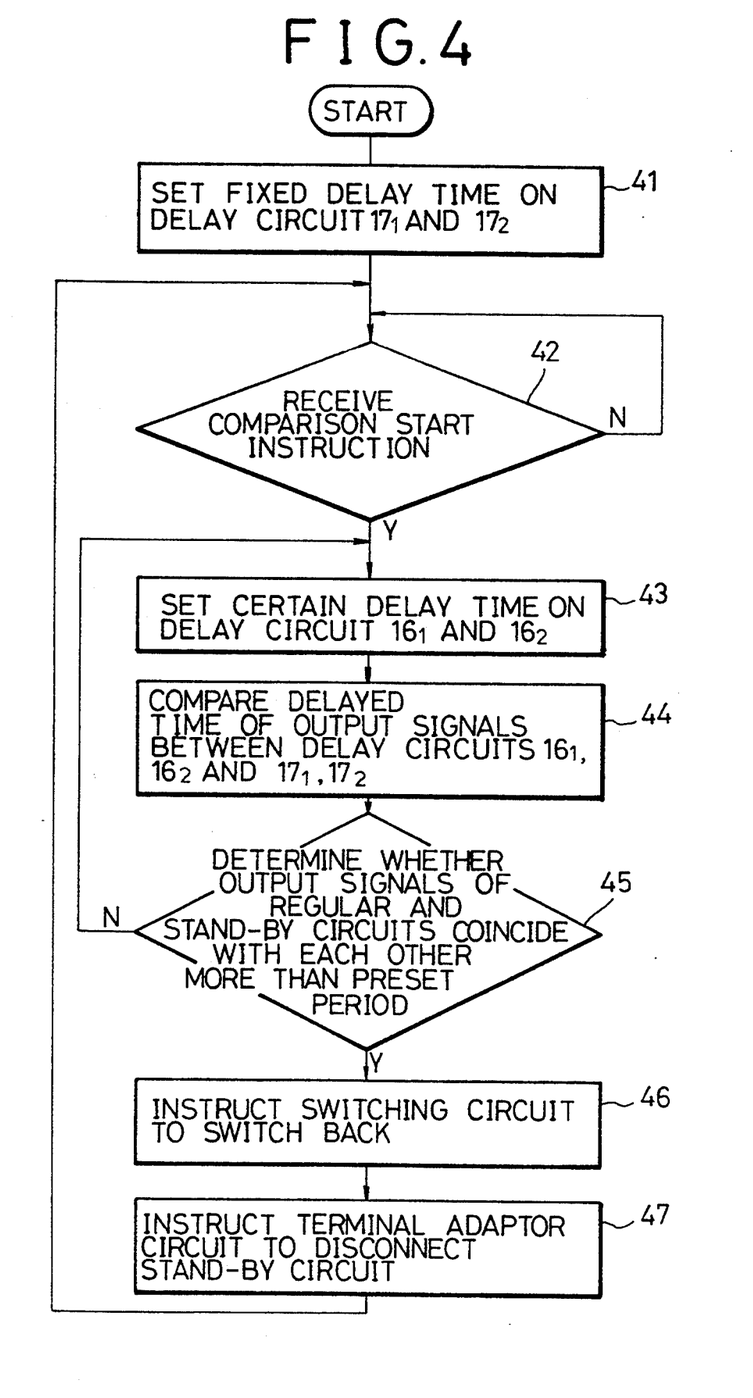
FIG. 4 is a flow chart showing operation of comparators $18_1$ and $18_2$ of the automatic circuit switching device shown in FIG. 2.
Figure 5:
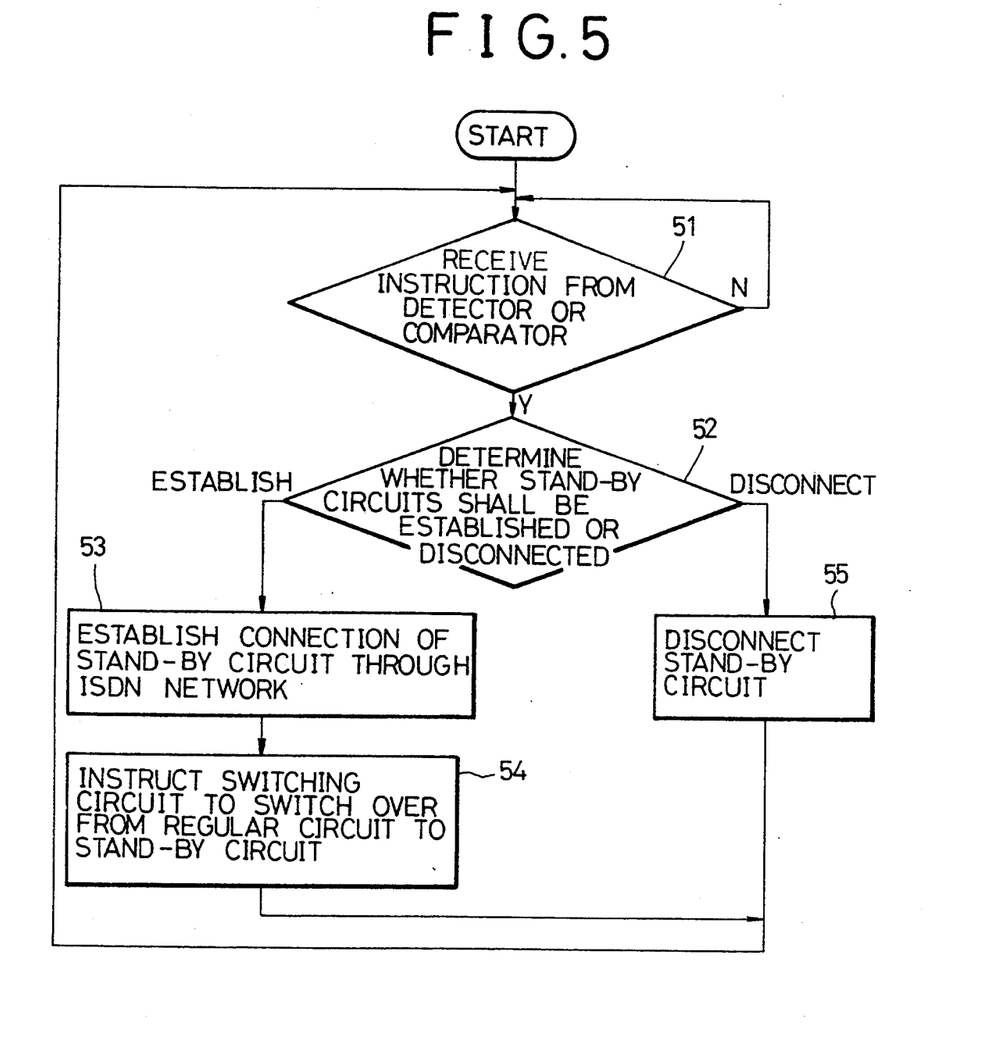
FIG. 5 is a flow chart showing operation of terminal adapters $15_1$ and $15_2$ of the automatic circuit switching device shown in FIG. 2.
Figure 6:
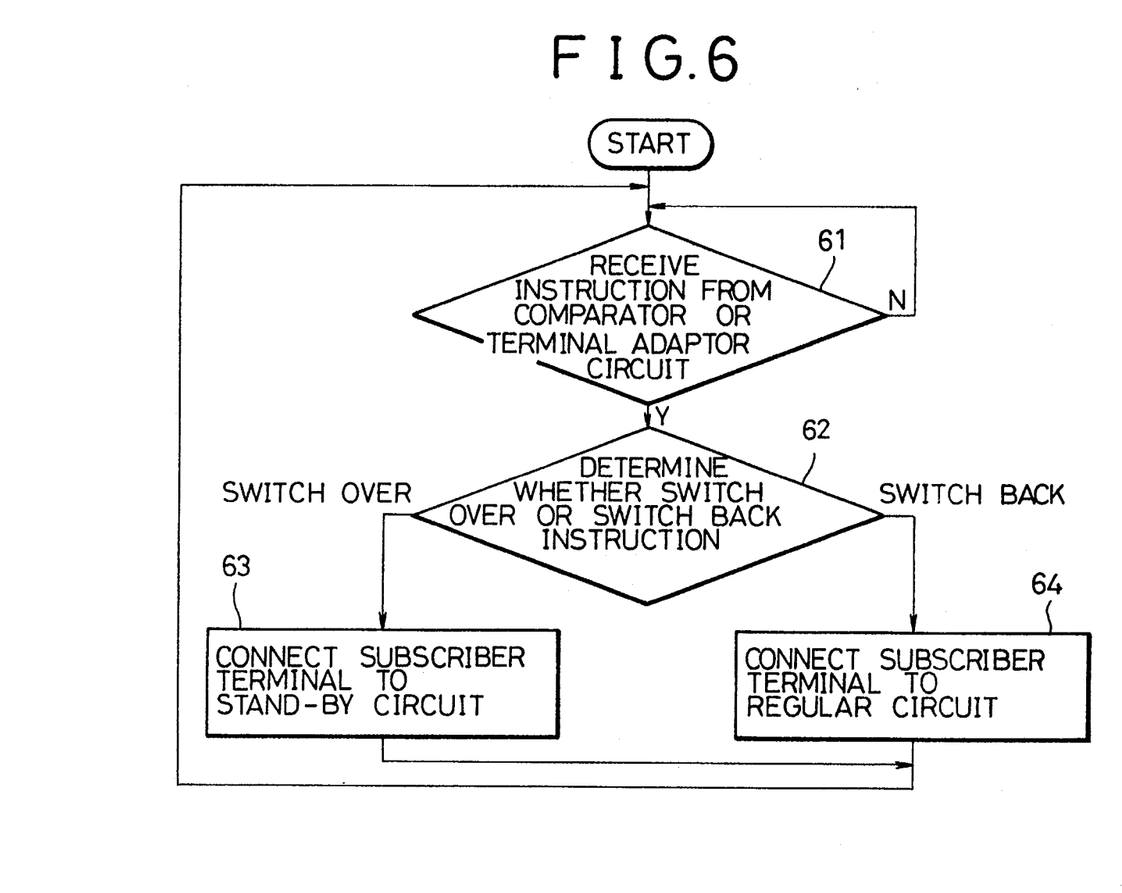
FIG. 6 is a flow chart showing operation of switching circuits $19_1$ and $19_2$ of the automatic circuit switching device shown in FIG. 2.

FIG. 3 is a flow chart showing the operation of detectors $14_1$, $14_2$ of the automatic circuit switching device shown in FIG. 2. FIG. 4 is a flow chart showing the operation of comparators $18_1$, $18_2$ of the automatic circuit switching device shown in FIG. 2. FIG. 5 is a flow chart showing the operation of terminal adapters $15_1$, $15_2$ of the automatic circuit switching device shown in FIG. 2. FIG. 6 is a flow chart showing the operation of switching circuits $19_1$, $19_2$ of the automatic circuit switching device shown in FIG. 2.

The process by which automatic circuit switching operation is performed through monitoring signals such as signal RS for requesting the transmission of the carrier current, signal CS for showing that DCE $1_1$, DCE $1_2$ is ready to receive data and-signal CD for showing reception of the carrier will first be described.

In this embodiment, the carrier is always kept transmitting in data-circuit-terminating equipment $1_1$, $1_2$.

When data transmission is performed normally by using data-circuit-terminating equipment $1_1$, $1_2$, they transmit carrier on the circuit when they receive carrier sent from respective subscriber terminals and the transmission unit of the receiving side turns on the signal CD upon receiving the carrier.

Since automatic circuit switching devices $10_1$, $10_2$ each are provided between subscriber terminals and data-circuit-terminating equipment $1_1$, $1_2$, detectors $14_1$, $14_2$ each determine that normal operation is maintained while carrier detecting signal CD is detected (steps 31, 32), then detectors $14_1$, $14_2$ do not output instruction to establish a stand-by circuit. When no carrier is detected due to a trouble such as disconnection of circuit, data-circuit-terminating equipment $1_1$, $1_2$ turn off signal CD (step 31). Detectors $14_1$, $14_2$ each output the instruction signal to establish the stand-by circuit to terminal adaptor circuits $15_1$ $15_2$ when they detect that signal CD is off for more than a predetermined period (steps 31, 33).

As shown in FIGS. 5 and 6 when receiving the instruction signal to establish stand-by circuit from detectors $14_1$, $14_2$ (step 51), terminal adaptor circuits $15_1$, $15_2$ establish stand-by circuit 4 through the ISDN network (steps 52, 53), and switching circuits $19_1$, $19_2$ each switch over the connection of the subscriber terminals from regular circuit 2 to stand-by circuit 4 through delay circuit $17_1$, $17_2$ based on the switch over instruction signal outputted from terminal adaptor circuits $15_1$, $15_2$ (step 54). Receiving the switch over instruction signal (step 61), switching circuits $19_1$, $19_2$ determine the received signal is the switch over instruction (step 62), and connect the subscriber terminals to stand-by circuit 4 (step 63).

As shown in FIG. 3, detectors $14_1$, $14_2$ monitor signal CD continuously even in the switched off or released state of the regular circuit 2. When regular circuit 2 is restored and the carrier is transmitted, carrier detection signal CD of data-circuit-terminating equipment $1_1$, $1_2$ becomes ON. When detectors $14_1$, $14_2$ each receive signal CD for more than a predetermined period (step 31), they output comparison start instruction signal to comparators $18_1$, $18_2$ (step 34) when they determine that the regular circuit is not in service (step 32).

When comparators $18_1$, $18_2$ each receive the comparison start instruction signal from detectors $14_1$, $14_2$ (step 41), they set a fixed delay time on delay circuits $17_1$, $17_2$ in advance (step 42), and set an initial delay time which is determined in advance on delay circuits $16_1$, $16_2$ (step 43). The first comparison between the outputs of delay circuits $16_1$, $16_2$ and delay circuits $17_1$, $17_2$ are performed respectively (step 44). When the results of this comparison coincide for a determined period (bit numbers) (step 45), comparators $18_1$, $18_2$ each instruct delay circuits $16_1$, $16_2$ to fix the delay time and concurrently instruct switching circuits $19_1$, $19_2$ to perform switch-back operation (step 46), and also instruct terminal adaptor circuits $15_1$, $15_2$ to disconnect the back-up circuits 4 (step 47). When the above comparison results do not coincide, comparators $18_1$, $18_2$ reset the delay time by adding the predetermined additional time to the initial delay time on delay circuits $16_1$, $16_2$ and perform a second comparison. This comparison will be repeated until the comparison results coincide for the predetermined period (bit numbers).

Now, for example, assume the delay time of the regular circuit to be 50.00 [ms], of stand-by circuit to be 49.50 [ms], of fixing delay circuits $17_1$, $17_2$ to be 2.00 [ms], and the initial delay times of delay circuits $16_1$, $16_2$ to be set to 0.00 [ms] and the delay times of delay circuits $16_1$, $16_2$ to be increased by 0.05 [ms] per comparison. After 30 repetitions of the above comparison, switch back of the circuit is performed without hit or disconnection (bit irregularity). When switch back is operated according to the conventional system, disconnection of data of 0.50 [ms] occurs.

Differences between the delay times smaller than 0.05 [ms] are to be absorbed by automatic circuit switching devices $1_1$, $1_2$ and terminal adaptors $15_1$, $15_2$.

As described above, it is necessary to set an appropriate fixed delay time on delay circuits $17_1$, $17_2$ to make this operation effective, even when the delay time of the stand-by circuit is less than that of the regular circuit.

In order to decide the delay time to be set on delay circuits $16_1$, $16_2$, it is possible to apply various commonly known methods other than the method shown in the present embodiment.

When switching circuits $19_1$, $19_2$ each receive the switch back instruction from the comparators (step 61), they connect the subscriber terminals to regular circuit at their corresponding delay circuits $16_1$, $16_2$ (steps 62, 64), whereby the back up state is canceled and the connection returns to the normal operation state.

Although the invention has been described in its preferred from with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method of automatically switching a connection of a data terminal between a circuit which is assigned to the data terminal as its active circuit and a standby circuit in a public data communications network, comprising the steps of:

monitoring an operational condition of said active circuit;

outputting an operational condition signal indicating that said active circuit is not operational when the active circuit is not operational;

switching over the connection of said data terminal from said active circuit to the standby circuit upon receipt of the operational condition signal indicating said active circuit is not operational;

detecting restoration of said active circuit when said standby circuit is in use;

outputting an operational condition signal indicating that said active circuit is restored to being operational;

synchronizing said active circuit with said standby circuit in use when receiving the operational condition signal indicating that said active circuit is restored to be operational;

outputting a synchronization completion signal indicating that the synchronization is completed when said synchronization is completed;

switching back the connection of said data terminal from said standby circuit to said active circuit upon receipt of the synchronization completion signal, wherein said synchronization step includes the steps of:

varying respective delays of two variable delay circuits, one of said variable delay circuits being connected to said active circuit and the other of said variable delay circuits being connected to said standby circuit; and comparing the outputted signals from both of said active and standby circuits until said outputted signals coincide for a predetermined time.

2. An automatic circuit switching drive for switching a connection of a data terminal between a circuit which is assigned to the data terminal as its active circuit and a standby circuit by dialing in a public data communications network, comprising:

means for monitoring an operational condition of said active circuit;

means for outputting an operational condition signal indicating that said active circuit is not operational when the active circuit is not operational;

means for switching over the connection of said data terminal from said active circuit to the standby circuit upon receipt of the operational condition signal indicating said active circuit is not operational;

means for detecting restoration of said active circuit when said standby circuit is in use;

means for outputting an operational condition signal indicating that said active circuit is restored to being operational;

means for synchronizing said active circuit with said standby circuit in use when receiving the operational condition signal indicating that said active circuit is restored to be operational;

means for outputting a synchronization completion signal indicating that the synchronization is completed when said synchronization is completed; and means for switching back the connection of said data terminal from said standby circuit to said active circuit upon receipt of the synchronization completion signal, wherein said means for synchronizing further includes:

means for varying respective delays of two variable delay circuits, one of said variable delay circuits being connected to said active circuit and the other of said variable delay circuits being connected to said standby circuit; and means for comparing the outputted signals from both of said active and standby circuits until said outputted signals coincide for a predetermined time.

* * * * *